(12) United States Patent
Jang et al.

(10) Patent No.: US 8,343,004 B2
(45) Date of Patent: Jan. 1, 2013

(54) POWERTRAIN OF AN AUTOMATIC TRANSMISSION

(75) Inventors: Wookjin Jang, Yongin (KR); Kun Soo Jung, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 762 days.

(21) Appl. No.: 12/476,968

(22) Filed: Jun. 2, 2009

(65) Prior Publication Data

US 2009/0312141 A1     Dec. 17, 2009

(30) Foreign Application Priority Data

Jun. 13, 2008   (KR) ........................ 10-2008-0055909

(51) Int. Cl.
*F16H 3/62* (2006.01)
(52) U.S. Cl. ........................................ 475/275; 475/277
(58) Field of Classification Search ........................ None
See application file for complete search history.

(56) References Cited

U.S. PATENT DOCUMENTS

| | | | |
|---|---|---|---|
| 5,342,257 A * | 8/1994 | Hotta et al. .................... | 475/275 |
| 6,910,985 B2 * | 6/2005 | Ishimaru et al. .............. | 475/275 |
| 7,059,994 B2 | 6/2006 | Usoro et al. | |
| 7,104,911 B2 | 9/2006 | Kaizu et al. | |
| 7,695,394 B2 | 4/2010 | Phillips et al. | |
| 7,824,301 B2 | 11/2010 | Kim | |
| 8,043,191 B2 | 10/2011 | Jang et al. | |
| 8,075,440 B2 | 12/2011 | Jang et al. | |
| 8,079,930 B2 | 12/2011 | Jang et al. | |
| 2005/0064982 A1 | 3/2005 | Kaizu et al. | |
| 2005/0250615 A1 | 11/2005 | Usoro et al. | |
| 2009/0209386 A1 | 8/2009 | Kim | |
| 2009/0291800 A1 | 11/2009 | Jang et al. | |
| 2009/0312139 A1 | 12/2009 | Jang et al. | |
| 2009/0312140 A1 | 12/2009 | Jang et al. | |
| 2009/0312141 A1 | 12/2009 | Jang et al. | |
| 2011/0245017 A1 | 10/2011 | Kim | |

FOREIGN PATENT DOCUMENTS

JP    2005-106260 A    4/2005

* cited by examiner

*Primary Examiner* — David D Le
*Assistant Examiner* — Erin D Bishop
(74) *Attorney, Agent, or Firm* — Morgan, Lewis & Bockius LLP

(57) ABSTRACT

A powertrain of an automatic transmission includes a first planetary gear set having first, second, and third operating members, a second planetary gear set having fourth, fifth, and sixth operating members, and third planetary gear set having seventh, eighth, and ninth operating members, the fourth and seventh operating members being fixedly interconnected, the fifth and ninth operating members being fixedly interconnected, the third and eighth operating members being selectively interconnected, the second and seventh operating members being selectively interconnected, the second and sixth operating members being selectively interconnected, wherein a transmission case is fixedly connected to the first operating member and selectively connected to the seventh and eighth operating members, an input shaft is fixedly connected to the third operating member and selectively connected to the seventh operating member, and an output shaft is fixedly connected to the ninth operating member.

5 Claims, 7 Drawing Sheets

FIG.2

| | C1 | C2 | C3 | C4 | B1 | B2 | SPEED RATIO | GEAR STEP | STEP RATIO |
|---|---|---|---|---|---|---|---|---|---|
| | | | | ● | | ● | 4.381 | 1 | |
| | | | | ● | ● | | 2.612 | 2 | 1.677 |
| | ● | | ● | ● | | | 1.769 | 3 | 1.476 |
| | | ● | | ● | | | 1.417 | 4 | 1.248 |
| | ● | ● | | | | | 1.213 | 5 | 1.169 |
| | | ● | ● | | | | 1.000 | 6 | 1.213 |
| | | ● | | | ● | | 0.828 | 7 | 1.207 |
| | | | ● | | | | 0.677 | 8 | 1.223 |
| | ● | | | | | ● | -3.715 | R1 | |
| | | | ● | | | ● | -2.100 | R2 | 1.769 |

POWERTRAIN OF AN AUTOMATIC TRANSMISSION

CROSS-REFERENCE TO RELATED APPLICATION

The present application claims priority to Korean Patent Application Number 10-2008-0055909 filed Jun. 13, 2008, the entire contents of which application is incorporated herein for all purposes by this reference.

BACKGROUND OF THE INVENTION

1. Field of the Invention

The present invention relates to a powertrain of an automatic transmission. More particularly, the present invention relates to a powertrain of an automatic transmission that enables eight forward speeds and two reverse speeds by combining three simple planetary gear sets and six frictional elements.

2. Description of Related Art

A typical shift mechanism of an automatic transmission utilizes a combination of a plurality of planetary gear sets. A gear train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a gear train such as durability, efficiency in power transmission, and size depend a lot on the layout of combined planetary gear sets. Therefore, designs for a combining structure of a gear train are also under constant investigation.

A manual transmission that has too many speeds causes inconvenience of excessively frequent shifting operations to a driver. Therefore, the positive features of more shift-speeds are more important for automatic transmissions because an automatic transmission automatically controls shifting operations basically without needing manual operation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a powertrain of an automatic transmission having advantages of enabling eight forward speeds and two reverse speeds by combining three simple planetary gear sets and six frictional elements.

In an aspect, the present invention may provide a powertrain of an automatic transmission that includes a first planetary gear set having a first operating member fixedly connected to a transmission case, a second operating member, and a third operating member fixedly connected to an input shaft, a second planetary gear set having a fourth operating member, a fifth operating member, and a sixth operating member selectively connected to the second operating member, a third planetary gear set having a seventh operating member fixedly connected to the fourth operating member, selectively connected to the input shaft, and selectively connected to the transmission case, an eighth operating member selectively connected to the third operating member and selectively connected to the transmission case, and a ninth operating member fixedly connected to the fifth operating member and fixedly connected to an output shaft, and a plurality of friction members that selectively connect operating members of the first, second, and third planetary gear sets, the input shaft, the output shaft, and the transmission case.

The plurality of friction members may include a first clutch selectively connecting the input shaft and the seventh operating member, a second clutch selectively connecting the third operating member and the eighth operating member, a third clutch selectively connecting the second operating member and the seventh operating member, a fourth clutch selectively connecting the second operating member and the sixth operating member, a first brake selectively connecting the seventh operating member to the transmission case, and a second brake selectively connecting the eighth operating member to the transmission case.

The first planetary gear set may be a double pinion planetary gear set having operating members of a first sun gear, a first ring gear, and a first planet carrier, the first sun gear acting as the first operating member, the first ring gear acting as the second operating member, and the first planet carrier acting as the third operating member.

The second planetary gear set may be a single pinion planetary gear set having operating members of a second sun gear, a second planet carrier, and a second ring gear, the second sun gear acting as the fourth operating member, the second planet carrier acting as the fifth operating member, and the second ring gear acting as the sixth operating member.

The second planetary gear set may be a double pinion planetary gear set having operating members of a second sun gear, a second ring gear, and a second planet carrier, the second sun gear acting as the fourth operating member, the second ring gear acting as the fifth operating member, and the second planet carrier acting as the sixth operating member.

The third planetary gear set may be a double pinion planetary gear set having operating members of a third sun gear, a third ring gear, and a third planet carrier, the third sun gear acting as the seventh operating member, the third ring gear acting as the eighth operating member, and the third planet carrier acting as the ninth operating member.

It may be configured that the fourth clutch and the second brake operate for a first forward speed, the fourth clutch and the first brake operate for a second forward speed, the third clutch and the fourth clutch operate for a third forward speed, the first clutch and the fourth clutch operate for a fourth forward speed, the second clutch and the fourth clutch operate for a fifth forward speed, the first clutch and the second clutch operate for a sixth forward speed, the second clutch and the third clutch operate for a seventh forward speed, the second clutch and the first brake operate for an eighth forward speed, the third clutch and the second brake operate for a first reverse speed, and the first clutch and the second brake operate for a second reverse speed.

When the second planetary gear set is a single pinion planetary gear set, the plurality of friction members may include a first clutch selectively connecting the input shaft and the third sun gear, a second clutch selectively connecting the first planet carrier and the third ring gear, a third clutch selectively connecting the first ring gear and the third sun gear, a fourth clutch selectively connecting the first ring gear and the second ring gear, a first brake selectively connecting the third sun gear to the transmission case, and a second brake selectively connecting the third ring gear to the transmission case.

When the second planetary gear set is a double pinion planetary gear set, the plurality of friction members may include a first clutch selectively connecting the input shaft and the third sun gear, a second clutch selectively connecting the first planet carrier and the third ring gear, a third clutch selectively connecting the first ring gear and the third sun gear, a fourth clutch selectively connecting the first ring gear and the second planet carrier, a first brake selectively connecting the third sun gear to the transmission case, and a second brake selectively connecting the third ring gear to the transmission case.

According to the exemplary powertrain of an automatic transmission of the present invention, eight forward speeds and two reverse speeds can be enabled by combining three simple planetary gear sets and six frictional elements.

In addition, a large number of shift-speeds are enabled, and thus power delivery performance may be improved and fuel consumption may be reduced by effectively utilizing an engine power.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart of a powertrain of an exemplary automatic transmission according to the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
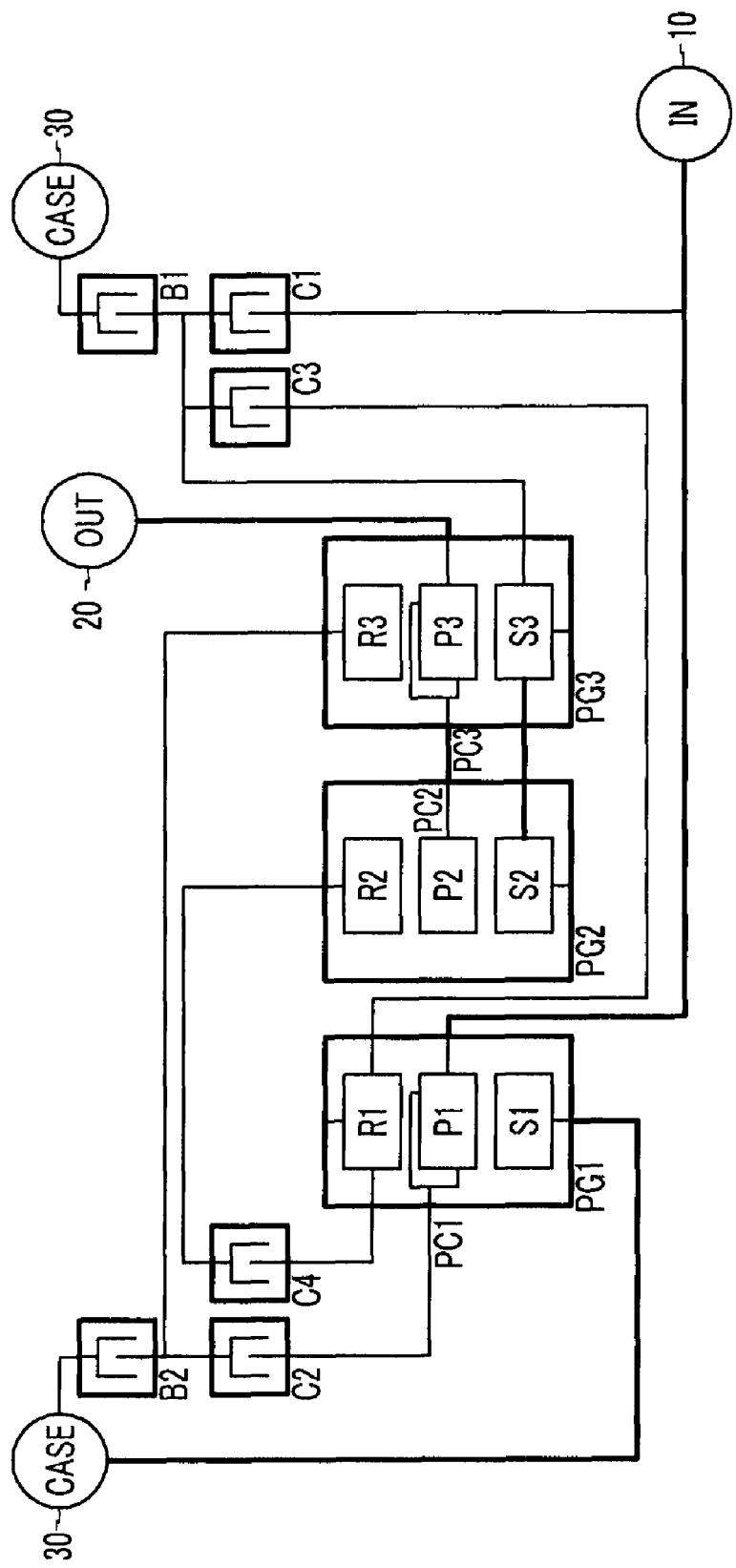
FIG. 1 is a schematic diagram of a powertrain of an exemplary automatic transmission according to the present invention.

As shown in FIG. 1, a powertrain of an automatic transmission according to various embodiments of the present invention includes an input shaft 10, an output shaft 20, a transmission case 30, and first, second, and third planetary gear sets PG1, PG2, and PG3.

The input shaft 10 receives a torque from an engine (not shown) through a torque converter (not shown).

The output shaft 20 outputs a torque from the powertrain.

The first planetary gear set PG1 is a double pinion planetary gear set having operating members of a first sun gear S1, a first ring gear R1, and a first planet carrier PC1. A first pinion gear P1 is connected to the first planet carrier PC1 and gear-engaged with the first sun gear S1 and the first ring gear R1 so that the first planet carrier PC1 rotates by the rotation of the first pinion gear P1.

The second planetary gear set PG2 is a single pinion planetary gear set having operating members of a second sun gear S2, a second planet carrier PC2, and a second ring gear R2. A second pinion gear P2 is connected to the second planet carrier PC2 and gear-engaged with the second sun gear S2 and the second ring gear R2 so that the second planet carrier PC2 rotates by the rotation of the second pinion gear P2.

The third planetary gear set PG3 is a double pinion planetary gear set having operating members of a third sun gear S3, a third ring gear R3, and a third planet carrier PC3. A third pinion gear P3 is connected to the third planet carrier PC3 and gear-engaged with the third sun gear S3 and the third ring gear R3 so that the third planet carrier PC3 rotates by the rotation of the third pinion gear P3.

The first sun gear S1, the first ring gear R1, and the first planet carrier PC1 is also called first, second, and third operating members N1, N2, and N3 of a powertrain of an automatic transmission according to various embodiments of the present invention. The second sun gear S2, the second planet carrier PC2, and the second ring gear R2 is also called fourth, fifth, and sixth operating members N4, N5, and N6 of a powertrain of an automatic transmission according to various embodiments of the present invention. The third sun gear S3, the third ring gear R3, and the third planet carrier PC3 is also called seventh, eighth, and ninth operating members N7, N8, and N9 of a powertrain of an automatic transmission according to various embodiments of the present invention.

The first planet carrier PC1 is fixedly connected with the input shaft 10 and always acts as an input member. The third planet carrier PC3 is fixedly connected with the output shaft 20 and always acts as an output member. The first sun gear S1 is fixedly connected with the transmission case 30 and always acts as a fixed member.

The second sun gear S2 is fixedly connected with the third sun gear S3. The second planet carrier PC2 is fixedly connected with the third planet carrier PC3.

A powertrain of an automatic transmission according to various embodiments of the present invention utilizes a plurality of friction members, in more detail, six friction members.

The plurality of friction members includes: a first clutch C1 selectively connecting the input shaft 10 and the seventh operating member N7; a second clutch C2 selectively connecting the third operating member N3 and the eighth operating member N8; a third clutch C3 selectively connecting the second operating member N2 and the seventh operating member N7; a fourth clutch C4 selectively connecting the second operating member N2 and the sixth operating member N6; a first brake B1 selectively connecting the seventh operating member N7 to the transmission case 30; and a second brake B2 selectively connecting the eighth operating member N8 to the transmission case 30.

In more detail, the first clutch C1 selectively connects the input shaft 10 and the third sun gear S3. The second clutch C2 selectively connects the first planet carrier PC1 and the third ring gear R3. The third clutch C3 selectively connects the first ring gear R1 and the third sun gear S3. The fourth clutch C4 selectively connects the first ring gear R1 and the second ring gear R2. The first brake B1 selectively connects the third sun gear S3 to the transmission case 30. The second brake B2 selectively connects the third ring gear R3 to the transmission case 30.

As shown in FIG. 2, an automatic transmission according to various embodiments of the present invention realizes eight forward speeds and two reverse speeds by operating two friction members for respective shift-speeds.

In more detail, the fourth clutch C4 and the second brake B2 operate for the first forward speed D1. The fourth clutch C4 and the first brake B1 operate for the second forward speed D2. The third clutch C3 and the fourth clutch C4 operate for the third forward speed D3. The first clutch C1 and the fourth clutch C4 operate for the fourth forward speed D4. The second clutch C2 and the fourth clutch C4 operate for the fifth forward speed D5. The first clutch C1 and the second clutch C2 operate for the sixth forward speed D6. The second clutch C2 and the third clutch C3 operate for the seventh forward speed D7. The second clutch C2 and the first brake B1 operate for the eighth forward speed D8. The third clutch C3 and the second brake B2 operate for the first reverse speed Rev1. The first clutch C1 and the second brake B2 operate for the second reverse speed Rev2.

Formation of eight forward speeds and two reverse speeds by a powertrain of an automatic transmission according to various embodiments of the present invention is hereinafter described in detail.

Referring to FIG. 3 to FIG. 12, the third operating member N3 that always acts as an input member always rotates at the rotation speed of the input shaft 10. The first operating member N1 is always stationary by being fixedly connected with the transmission case 30. Therefore, a speed diagram of the first planetary gear set PG1 is fixed regardless of speed diagrams. That is, the first operating member N1 is stationary, the third operating member N3 rotates at the rotation speed of the input shaft 10, and the second operating member N2 rotates at a reduced speed which is slower than the rotation speed of the input shaft 10.

The fourth operating member N4 and the seventh operating member N7 always rotate at the same speed since they are fixedly connected with each other, and the fifth operating member N5 and the ninth operating member N9 always rotate at the same speed since they are fixedly connected with each other.

From such a constraint, the first to eighth forward speeds and two reverse speeds are realized by selective operation of the first to fourth clutches C1 to C4 and the first and second brakes B1 and B2, which is hereinafter described in detail.

[First Forward Speed]

The fourth clutch C4 and the second brake B2 operate for the first forward speed D1.

The sixth operating member N6 rotates at the reduced speed of the second operating member N2 since the fourth clutch C4 operates. The eighth operating member N8 stops since the second brake B2 operates.

Figure 3:
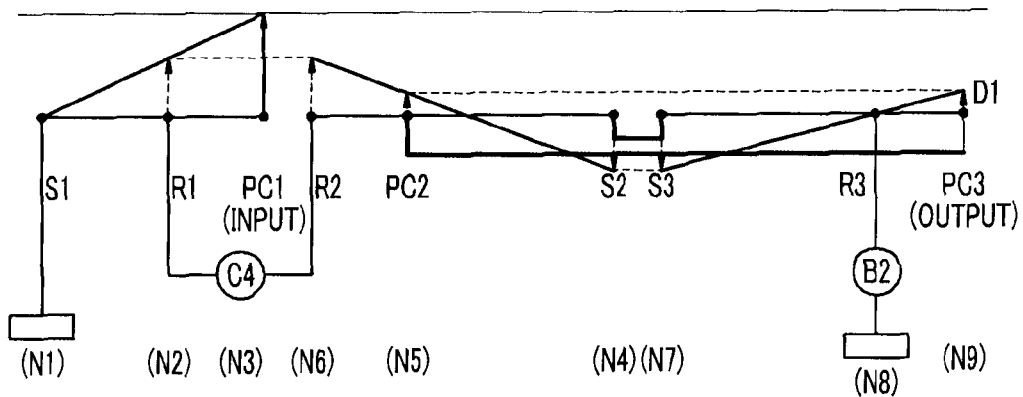
FIG. 3 is a speed diagram that shows exemplary rotation speeds of respective operating members at the first forward speed of a powertrain of an automatic transmission according to the present invention.

Therefore, the speed diagram of the second and third planetary gear sets PG2 and PG3 is formed as shown in FIG. 3, and the first forward speed D1 is outputted through the output member of the ninth operating member N9.

[Second Forward Speed]

The fourth clutch C4 and the first brake B1 operate for the second forward speed D2.

The sixth operating member N6 rotates at the reduced speed of the second operating member N2 since the fourth clutch C4 operates. The seventh operating member N7 stops since the first brake B1 operates.

Figure 4:
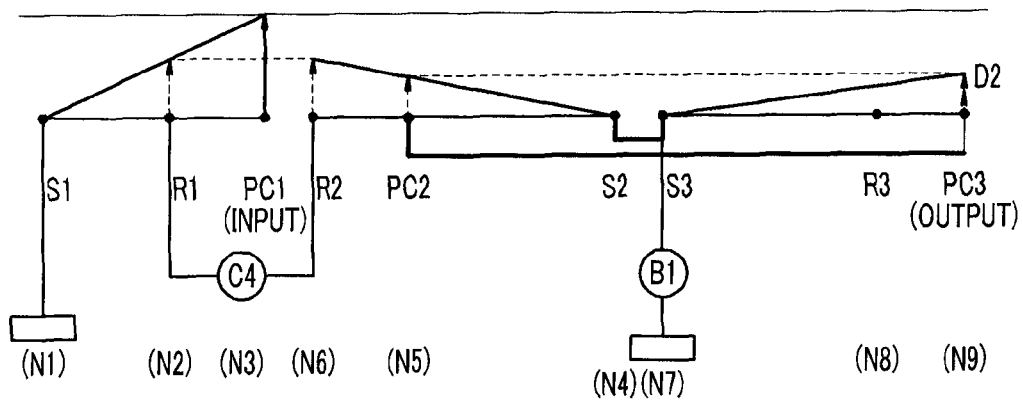
FIG. 4 is a speed diagram that shows exemplary rotation speeds of respective operating members at the second forward speed of a powertrain of an automatic transmission according to the present invention.

Therefore, speed diagram of the second and third planetary gear sets PG2 and PG3 is formed as shown in FIG. 4, and the second forward speed D2 is outputted through the output member of the ninth operating member N9.

[Third Forward Speed]

The third clutch C3 and the fourth clutch C4 operate for the third forward speed D3.

The sixth operating member N6 rotates at the reduced speed of the second operating member N2 since the fourth clutch C4 operates. The seventh operating member N7 rotates at the reduced speed of the second operating member N2 since the third clutch C3 operates. Since both the sixth operating member N6 and the seventh operating member N7 rotate at the reduced speed, the second and third planetary gear sets PG2 and PG3 integrally rotate at the reduced speed.

Figure 5:
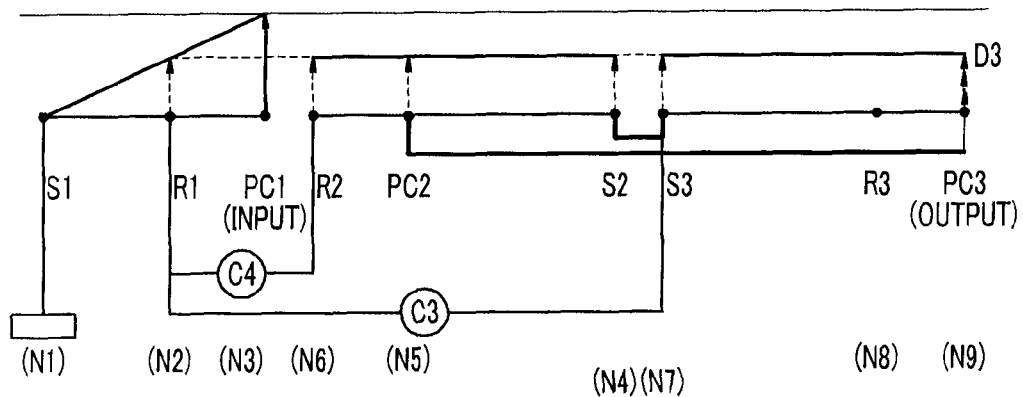
FIG. 5 is a speed diagram that shows exemplary rotation speeds of respective operating members at the third forward speed of a powertrain of an automatic transmission according to the present invention.

Therefore, the speed diagram of the second and third planetary gear sets PG2 and PG3 is formed as shown in FIG. 5, and the third forward speed D3 is outputted through the output member of the ninth operating member N9.

[Fourth Forward Speed]

The first clutch C1 and the fourth clutch C4 operate for the fourth forward speed D4.

The sixth operating member N6 rotates at the reduced speed of the second operating member N2 since the fourth clutch C4 operates. The seventh operating member N7 rotates at the same speed with the input shaft 10 since the first clutch C1 operates.

Figure 6:
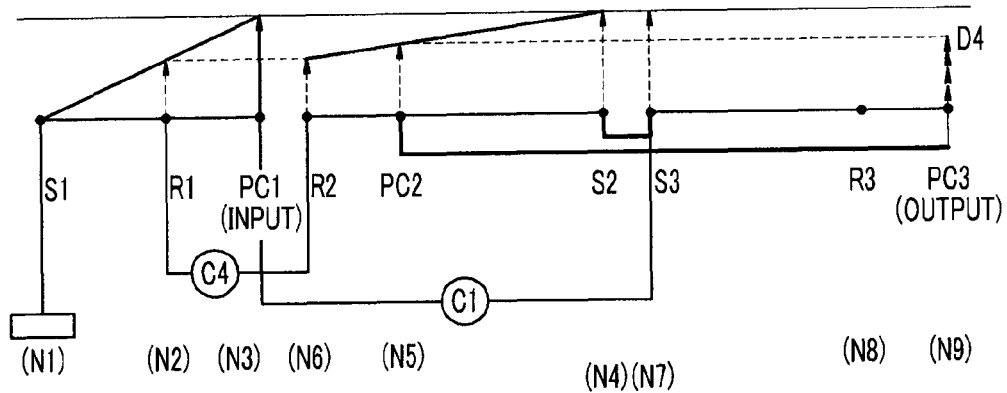
FIG. 6 is a speed diagram that shows exemplary rotation speeds of respective operating members at the fourth forward speed of a powertrain of an automatic transmission according to the present invention.

Therefore, the speed diagram of the second and third planetary gear sets PG2 and PG3 is formed as shown in FIG. 6, and the fourth forward speed D4 is outputted through the output member of the ninth operating member N9.

[Fifth Forward Speed]

The second clutch C2 and the fourth clutch C4 operate for the fifth forward speed D5.

The sixth operating member N6 rotates at the reduced speed of the second operating member N2 since the fourth clutch C4 operates. The eighth operating member N8 rotates at the same speed with the input shaft 10 since the second clutch C2 operates.

Figure 7:
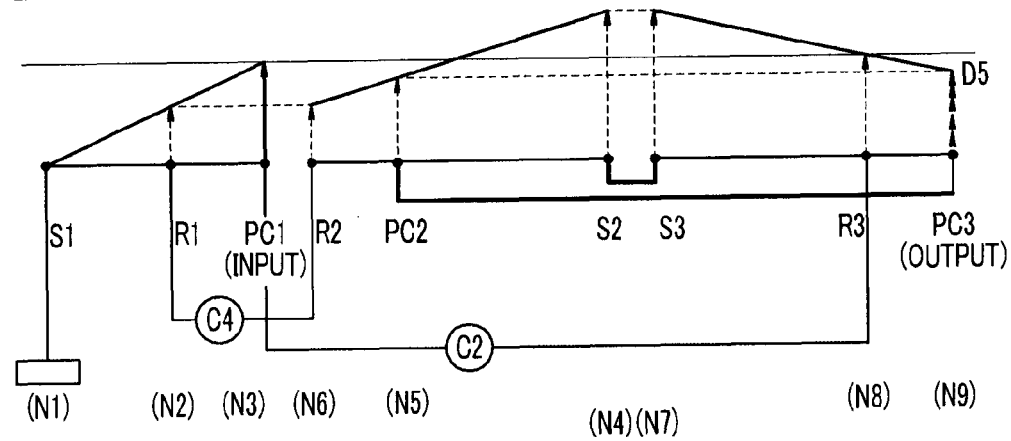
FIG. 7 is a speed diagram that shows exemplary rotation speeds of respective operating members at the fifth forward speed of a powertrain of an automatic transmission according to the present invention.

Therefore, the speed diagram of the second and third planetary gear sets PG2 and PG3 is formed as shown in FIG. 7, and the fifth forward speed D5 is outputted through the output member of the ninth operating member N9.

[Sixth Forward Speed]

The first clutch C1 and the second clutch C2 operate for the sixth forward speed D6.

The eighth operating member N8 rotates at the same speed with the input shaft 10 since the second clutch C2 operates. The seventh operating member N7 rotates at the same speed with the input shaft 10 since the first clutch C1 operates. Since both the eighth operating member N8 and the seventh operating member N7 rotate at the speed of the input shaft 10, the second and third planetary gear sets PG2 and PG3 integrally rotate at the rotation speed of the input shaft 10.

Figure 8:
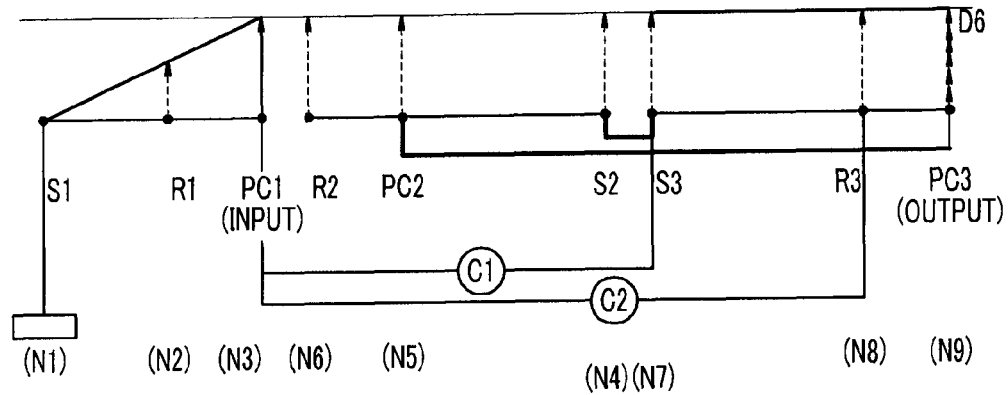
FIG. 8 is a speed diagram that shows exemplary rotation speeds of respective operating members at the sixth forward speed of a powertrain of an automatic transmission according to the present invention.

Therefore, the speed diagram of the second and third planetary gear sets PG2 and PG3 is formed as shown in FIG. 8, and the sixth forward speed D6 is outputted through the output member of the ninth operating member N9.

[Seventh Forward Speed]

The second clutch C2 and the third clutch C3 operate for the seventh forward speed D7.

The eighth operating member N8 rotates at the same speed with the input shaft 10 since the second clutch C2 operates. The seventh operating member N7 rotates at the reduced speed of the second operating member N2 since the third clutch C3 operates.

Figure 9:
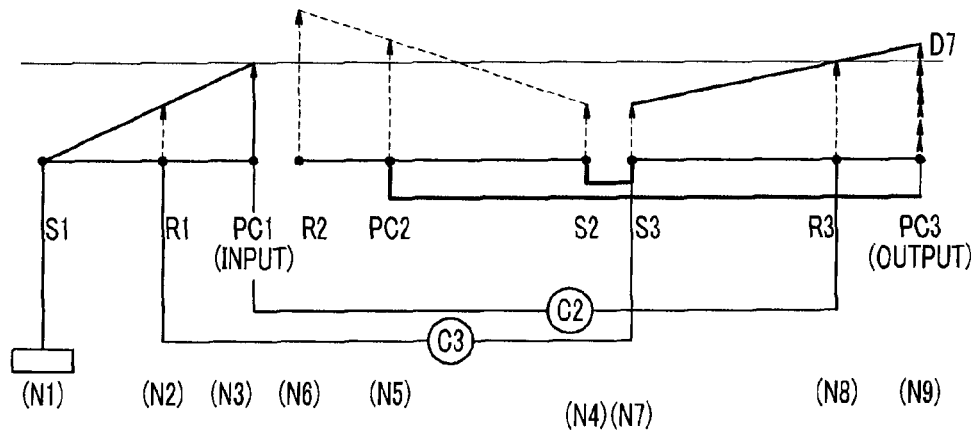
FIG. 9 is a speed diagram that shows exemplary rotation speeds of respective operating members at the seventh forward speed of a powertrain of an automatic transmission according to the present invention.

Therefore, the speed diagram of the second and third planetary gear sets PG2 and PG3 is formed as shown in FIG. 9, and the seventh forward speed D7 is outputted through the output member of the ninth operating member N9.

[Eighth Forward Speed]

The second clutch C2 and the first brake B1 operate for the eighth forward speed D8.

The eighth operating member N8 rotates at the same speed with the input shaft 10 since the first clutch C2 operates. The seventh operating member N7 stops since the first brake B1 operates.

Figure 10:
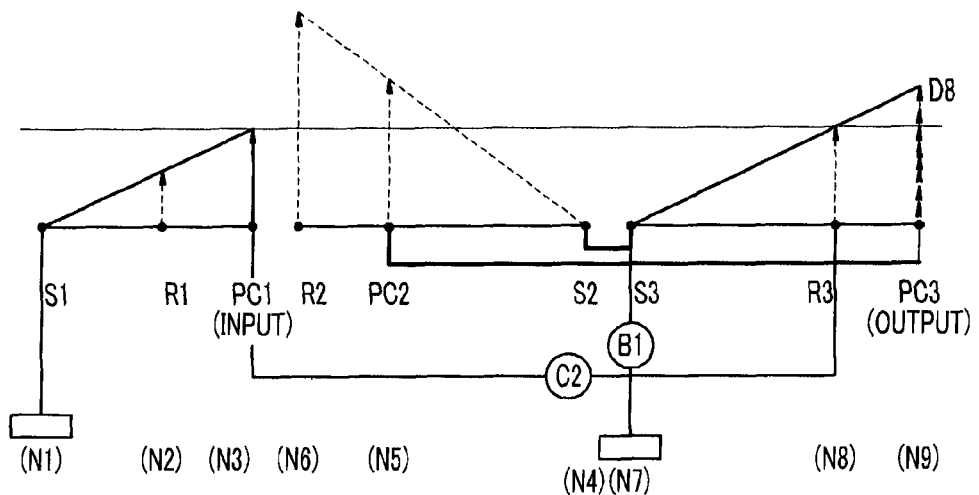
FIG. 10 is a speed diagram that shows exemplary rotation speeds of respective operating members at the eighth forward speed of a powertrain of an automatic transmission according to the present invention.

Therefore, the speed diagram of the second and third planetary gear sets PG2 and PG3 is formed as shown in FIG. 10, and the eighth forward speed D8 is outputted through the output member of the ninth operating member N9.

[First Reverse Speed]

The third clutch C3 and the second brake B2 operate for the first reverse speed Rev1.

The seventh operating member N7 rotates at the reduced speed of the second operating member N2 since the third clutch C3 operates. The eighth operating member N8 stops since the second brake B2 operates.

Figure 11:
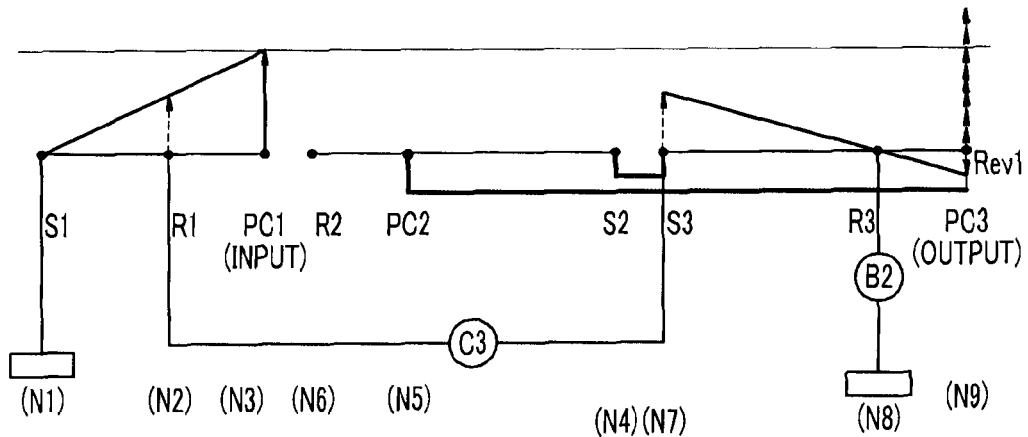
FIG. 11 is a speed diagram that shows exemplary rotation speeds of respective operating members at the first reverse speed of a powertrain of an automatic transmission according to the present invention.

Therefore, the speed diagram of the second and third planetary gear sets PG2 and PG3 is formed as shown in FIG. 11, and the first reverse speed Rev1 is outputted through the output member of the ninth operating member N9.

[Second Reverse Speed]

The first clutch C1 and the second brake B2 operate for the second reverse speed Rev2.

The seventh operating member N7 rotates at the same speed with the input shaft 10 since the first clutch C1 operates. The eighth operating member N8 stops since the second brake B2 operates.

Figure 12:
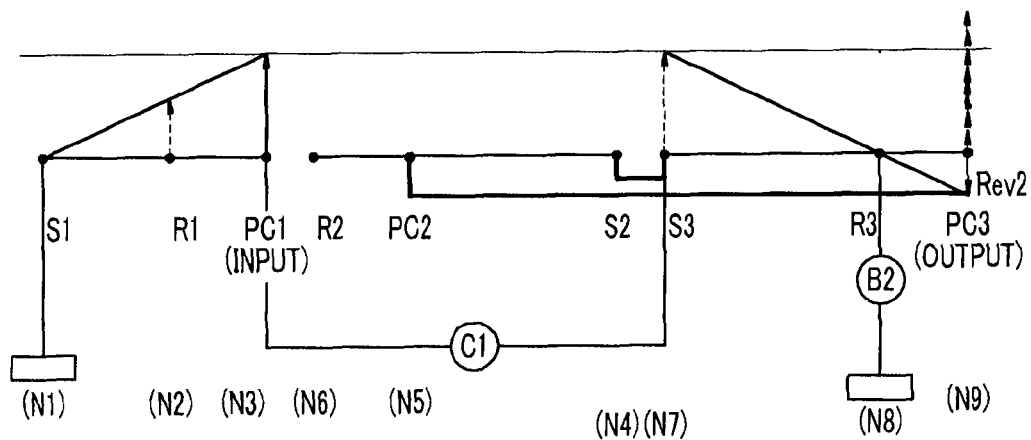
FIG. 12 is a speed diagram that shows exemplary rotation speeds of respective operating members at the second reverse speed of a powertrain of an automatic transmission according to the present invention.

Therefore, the speed diagram of the second and third planetary gear sets PG2 and PG3 is formed as shown in FIG. 12, and the second reverse speed Rev2 is outputted through the output member of the ninth operating member N9.

FIG. 2 shows an example of available speed ratios of the eight forward speeds and two reverse speeds. Such an example figures of speed ratios are obtained in connection with a case that the number of teeth of the sun and ring gears of the first planetary gear set PG1 are respectively 10 and 23, the number of teeth of the sun and ring gears of the second planetary gear set PG2 are respectively 10 and 21, and the number of teeth of the sun and ring gears of the third planetary gear set PG3 are respectively 10 and 31.

However, it should not be understood that the scope of the present invention is limited thereto. A variety of speed ratios may be obtained by modifying the number of teeth of the sun and ring gears of the first, second, and third planetary gear sets PG1, PG2, and PG3.

An example of the second planetary gear set PG2 being a single pinion planetary gear set is described in the above exemplary embodiment. However, it should not be understood that the scope of the present invention is limited thereto. An example of the second planetary gear set PG2 being a double pinion planetary gear set is hereinafter described in detail with reference with FIG. 13.

Figure 13:
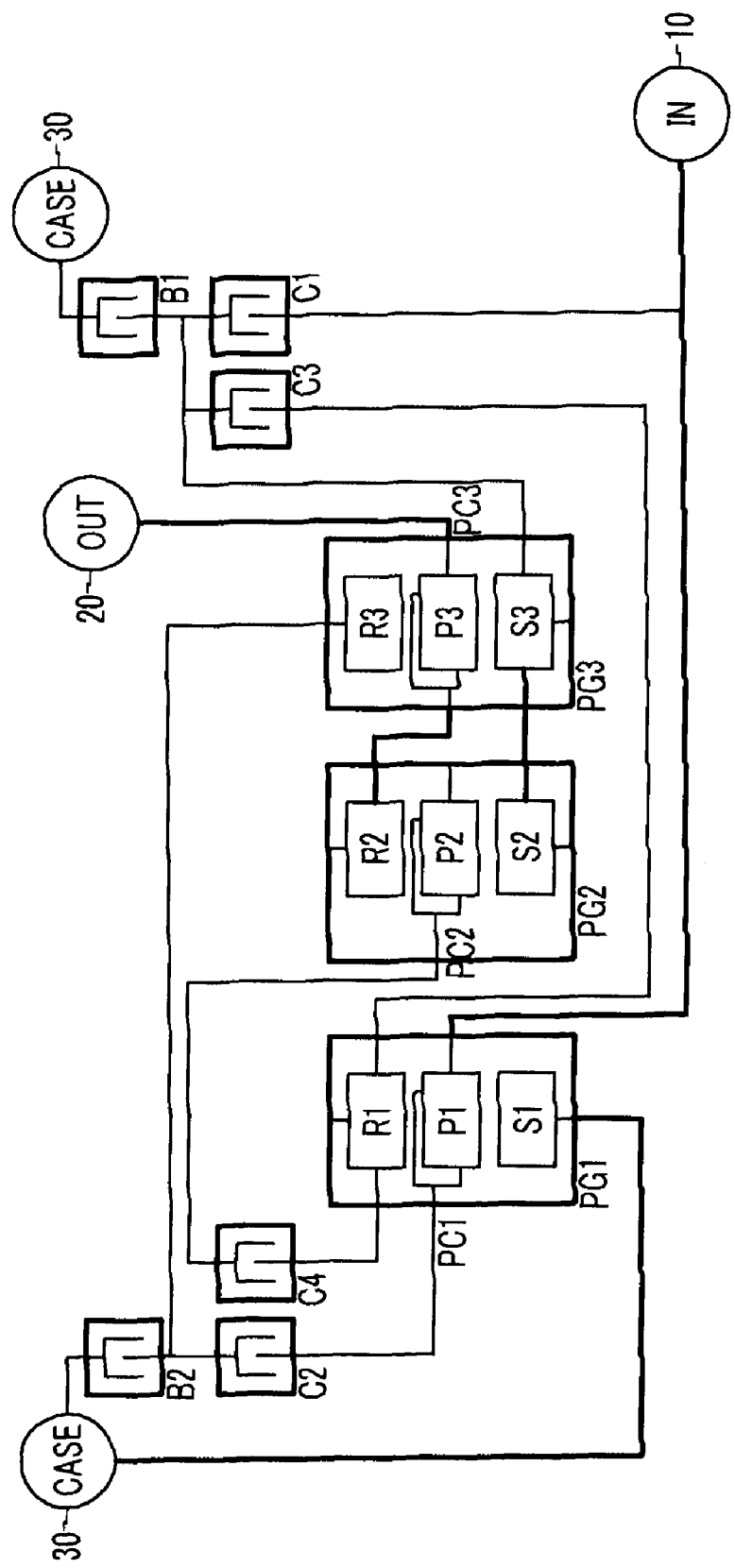
FIG. 13 is a schematic diagram of a powertrain of another exemplary automatic transmission according to the present invention.

As shown in FIG. 13, in a powertrain of an automatic transmission according to the second exemplary embodiment, the second planetary gear set PG2 is formed as a double pinion planetary gear set.

In FIG. 3 to FIG. 12, the operating members of the second planetary gear set PG2 are arranged in an order of the second ring gear R2, the second planet carrier PC2, and the second sun gear S2. According to the speed diagram of an automatic transmission of the present exemplary embodiment, operating members are arranged in an order of the second planet carrier PC2, the second ring gear R2, and the second sun gear S2. That is, the second planet carrier PC2 may be formed at a position of the second ring gear R2 in FIG. 3 to FIG. 12, and the second ring gear R2 may be formed at a position of the second planet carrier PC2 in FIG. 3 to FIG. 12.

According to such a configuration, the second sun gear S2, the second ring gear R2 and the second planet carrier PC2 may be called fourth, fifth, and sixth operating members N4, N5, and N6 of a powertrain of an automatic transmission according to the present exemplary embodiment.

Comparing FIG. 13 with FIG. 1, it is easily understood that interconnections applied to the second planet carrier PC2 (refer to FIG. 1) that is the fifth operating member N5 may be exactly applied (refer to FIG. 13) to the second ring gear R2 that is the fifth operating member N5 of the second exemplary embodiment. In addition, interconnections applied to the second ring gear R2 (refer to FIG. 1) that is the sixth operating member N6 may be exactly applied (refer to FIG. 13) to the second planet carrier PC2 that is the sixth operating member N6 of this second exemplary embodiment.

That is, the third planet carrier PC3 is fixedly connected with the second ring gear R2. The first clutch C1 selectively connects the input shaft 10 and the third sun gear S3. The second clutch C2 selectively connects the first planet carrier PC1 and the third ring gear R3. The third clutch C3 selectively connects the first ring gear R1 the third sun gear S3. The fourth clutch C4 selectively connects the first ring gear R1 and the second planet carrier PC2. The first brake B1 selectively connects the third sun gear S3 to the transmission case 30. The second brake B2 selectively connects the third ring gear R3 to the transmission case 30.

Therefore, a powertrain of an automatic transmission according to various embodiments may be controlled by the operational chart shown in FIG. 2, and accordingly, enables eight forward speeds and two reverse speeds by speed diagrams of FIG. 3 to FIG. 12.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A powertrain of an automatic transmission comprising:
    a first planetary gear set having:
        (1) a first operating member fixedly connected to a transmission case;
        (2) a second operating member; and
        (3) a third operating member fixedly connected to an input shaft;
    a second planetary gear set having:
        (1) a fourth operating member;
        (2) a fifth operating member; and
        (3) a sixth operating member selectively connected to the second operating member;
    a third planetary gear set having:
        (1) a seventh operating member fixedly connected to the fourth operating member, wherein the seventh operating member is selectively connected to the input shaft or to the transmission case;
        (2) an eighth operating member selectively connected to the third operating member or to the transmission case; and
        (3) a ninth operating member fixedly connected to the fifth operating member and fixedly connected to an output shaft; and
    a plurality of friction members, wherein each of the plurality of friction members selectively connects a respective one of the first, second, third, fourth, fifth, sixth, seventh eighth, and ninth operating members of the first, second, and third planetary gear sets with at least one other of the first, second, third, fourth, fifth, sixth, seventh, eighth, and ninth operating members of the first, second, and third planetary gear sets, the input shaft, and the transmission case;
    wherein the first planetary gear set is a double pinion planetary gear set having operating members of a first sun gear, a first ring gear, and a first planet carrier, the first sun gear acting as the first operating member, the first ring gear acting as the second operating member, and the first planet carrier acting as the third operating member;
    wherein the second planetary gear set is a single pinion planetary gear set having operating members of a second sun gear, a second planet carrier, and a second ring gear, the second sun gear acting as the fourth operating member, the second planet carrier acting as the fifth operating member, and the second ring gear acting as the sixth operating member; and
    wherein the third planetary gear set is a double pinion planetary gear set having operating members of a third sun gear, a third ring gear, and a third planet carrier, the third sun gear acting as the seventh operating member, the third ring gear acting as the eighth operating member, and the third planet carrier acting as the ninth operating member.

2. The powertrain of claim 1, wherein the plurality of friction members comprise:
    a first clutch selectively connecting the input shaft and the seventh operating member;
    a second clutch selectively connecting the third operating member and the eighth operating member;
    a third clutch selectively connecting the second operating member and the seventh operating member;
    a fourth clutch selectively connecting the second operating member and the sixth operating member;
    a first brake selectively connecting the seventh operating member to the transmission case; and
    a second brake selectively connecting the eighth operating member to the transmission case.

3. The powertrain of claim 2, wherein:
    the fourth clutch and the second brake operate for a first forward speed;
    the fourth clutch and the first brake operate for a second forward speed;
    the third clutch and the fourth clutch operate for a third forward speed;
    the first clutch and the fourth clutch operate for a fourth forward speed;
    the second clutch and the fourth clutch operate for a fifth forward speed;
    the first clutch and the second clutch operate for a sixth forward speed;
    the second clutch and the third clutch operate for a seventh forward speed;
    the second clutch and the first brake operate for an eighth forward speed;
    the third clutch and the second brake operate for a first reverse speed; and
    the first clutch and the second brake operate for a second reverse speed.

4. The powertrain of claim 1, wherein the plurality of friction members comprise:
    a first clutch selectively connecting the input shaft and the third sun gear;
    a second clutch selectively connecting the first planet carrier and the third ring gear;
    a third clutch selectively connecting the first ring gear and the third sun gear;
    a fourth clutch selectively connecting the first ring gear and the second ring gear;
    a first brake selectively connecting the third sun gear to the transmission case; and
    a second brake selectively connecting the third ring gear to the transmission case.

5. The powertrain of claim 4, wherein:
    the fourth clutch and the second brake operate for a first forward speed:
    the fourth clutch and the first brake operate for a second forward speed;
    the third clutch and the fourth clutch operate for a third forward speed;
    the first clutch and the fourth clutch operate for a fourth forward speed;
    the second clutch and the fourth clutch operate for a fifth forward speed;

the first clutch and the second clutch operate for a sixth forward speed;
the second clutch and the third clutch operate for a seventh forward speed;
the second clutch and the first brake operate for an eighth forward speed;

the third clutch and the second brake operate for a first reverse speed; and
the first clutch and the second brake operate for the second reverse speed.

* * * * *